United States Patent
Srinivasan et al.

(10) Patent No.: US 9,491,220 B2
(45) Date of Patent: Nov. 8, 2016

(54) SYSTEMS AND METHODS FOR ADAPTING MOBILE MULTIMEDIA CONTENT DELIVERY SERVICE

(71) Applicant: Infosys Limited, Bangalore (IN)

(72) Inventors: Karthik Srinivasan, Pune (IN); Poorva Agrawal, Pune (IN)

(73) Assignee: Infosys Limited, Bangalore (IN)

( * ) Notice: Subject to any disclaimer, the term of this patent is extended or adjusted under 35 U.S.C. 154(b) by 789 days.

(21) Appl. No.: 13/940,233

(22) Filed: Jul. 11, 2013

(65) Prior Publication Data

US 2014/0019634 A1    Jan. 16, 2014

(30) Foreign Application Priority Data

Jul. 16, 2012 (IN) .......................... 2862/CHE/2012

(51) Int. Cl.
```
G06F 15/16      (2006.01)
H04L 29/06      (2006.01)
H04N 21/2662    (2011.01)
H04N 21/25      (2011.01)
H04N 21/462     (2011.01)
H04N 21/466     (2011.01)
```
(52) U.S. Cl.
CPC ............ *H04L 65/80* (2013.01); *H04L 65/601* (2013.01); *H04N 21/251* (2013.01); *H04N 21/2662* (2013.01); *H04N 21/466* (2013.01); *H04N 21/4621* (2013.01); *H04L 65/4069* (2013.01)

(58) Field of Classification Search
CPC .. H04L 65/80; H04L 65/601; H04L 65/4069
USPC ........................... 709/230–232; 370/328–329
See application file for complete search history.

(56) References Cited

U.S. PATENT DOCUMENTS

| | | | |
|---|---|---|---|
| 6,014,694 A | 1/2000 | Aharoni et al. | |
| 6,243,761 B1 | 6/2001 | Mogul et al. | |
| 7,076,552 B2* | 7/2006 | Mandato | H04L 12/5695 |
| | | | 709/231 |
| 7,529,835 B1 | 5/2009 | Agronow et al. | |
| 7,809,830 B2 | 10/2010 | Denoual | |
| 8,855,469 B2* | 10/2014 | Maharajh | H04L 65/80 |
| | | | 709/231 |
| 2002/0136298 A1 | 9/2002 | Anantharamu et al. | |
| 2008/0229278 A1* | 9/2008 | Liu | G06F 8/36 |
| | | | 717/106 |

(Continued)

OTHER PUBLICATIONS

Wai Yip Lum and Francis C.M. Lau, A Context-Aware Decision Engine for Content Adaptation, Jul.-Sep. 2002.

*Primary Examiner* — Bharat N Barot

(74) *Attorney, Agent, or Firm* — Marc S. Kaufman; Reed Smith LLP

(57) ABSTRACT

The invention relates to a system and method for adapting mobile multimedia content delivery service to enhance the quality of experience of one or more users. This invention involves identifying all the contexts from different domains associated with the mobile multimedia content delivery service that can impact on the quality of experience of the end user. The invention maps the contexts with the quality of experience impactors. Based on this information an abstract adaptation model is created to define basic rules of adaptation. This model also defines the threshold for adaptation and also the different adaptation actions corresponding to different contexts. This model can be transformed into an implementable adaptation model taking real time constraints into consideration. The available contexts in real time are mapped with the contexts present in the abstract model and then decision making module decides when to adapt and how to adapt the multimedia content.

29 Claims, 6 Drawing Sheets

(56) References Cited

U.S. PATENT DOCUMENTS

2010/0142447 A1* 6/2010 Schlicht .................. H04W 4/20
370/328
2012/0023256 A1 1/2012 Chen et al.
2012/0284009 A1* 11/2012 De Florio ................. G06F 8/10
703/22
2013/0036234 A1* 2/2013 Pazos ...................... H04L 65/00
709/231

* cited by examiner

SYSTEMS AND METHODS FOR ADAPTING MOBILE MULTIMEDIA CONTENT DELIVERY SERVICE

RELATED APPLICATION DATA

This application claims priority to India Patent Application No. 2862/CHE/2012, filed Jul. 16, 2012, the disclosure of which is hereby incorporated by reference in its entirety.

FIELD OF THE INVENTION

The present invention relates generally to adapt mobile multimedia content based on different contexts, and in particular, to a system and method for adapting mobile multimedia content delivery service to enhance the quality of experience of one or more users.

BACKGROUND

In the case of multimedia-based services delivery over heterogeneous environments, the challenge is to provide a consistent and uniform Quality of Experience (QoE) to the end user, while utilizing the available network resources efficiently. The QoE may be affected by a number of factors such as available bandwidth, variable link quality, network congestion, device resolution and screen size and so on. The user expectation is to be able to access multimedia services over any device and across heterogeneous network.

Presently, there are multiple technologies that support dynamic adaptation. All these techniques are vendor specific implementations that use limited context information to trigger adaptation of content. For example, some techniques may use buffering rate to design the adaptation rules, some other techniques may use current bandwidth, content metadata and buffering rate calculation for adaptation. For web content, most platforms provide the feature of selecting current network connection type (normal or low bandwidth). Based on this, the back-end serves pages with appropriate rich media content. It is not currently feasible to support features like dynamic selection and rendering of rich media based on current network state.

The drawbacks of the present technologies include server centric approach and not much information is available from the client side to decide on when to adapt. The Adaptation algorithms vary greatly in their interpretation of the network conditions leading to widely varying end user experience. They take only available bandwidth as context without integrating other contexts while in reality any change in the environment may act as trigger, not just the bandwidth. The Use of limited context (e.g. bandwidth estimates, buffering rate) results in sub-optimal adaptation decisions, for example the approach to be taken for congestion in wireless network would be different from congestion in the core network. The former can be addressed by varying rate at which content is fetched, while the latter may require adaptation of the content.

In view of the foregoing discussion, there is a need for an adaptation model which is not vendor specific, able to use multitude of contexts (e.g. device context, user context, location, latency etc.) and not restricted to any particular platform and deployment environment.

SUMMARY

The present invention solves the above mentioned problems by formulating a model driven approach that is able to use multitude of contexts and not restricted to any particular platform and deployment environment. This model driven approach has the flexibility in terms of how the model can be deployed (e.g. client side, server side, hybrid) as well as how it can be adapted to operate under different run time constraints. This can be easily supported on multiple mobile platforms as well as embedded in server side infrastructure.

According to the present embodiment, a method for adapting mobile multimedia content delivery service to enhance quality of experience of one or more users is described. The method includes identifying one or more contexts that impact the quality of experience from one or more domains associated with the mobile multimedia content delivery service. In various embodiments of present invention, the one or more contexts are represented as one or more attributes associated with the one or more contexts. Thereafter, one or more quality of experience impactors and an association between the one or more contexts and the one or more quality of experience impactors are identified. After that, one or more adaptation are identified which can be performed in the one or more domains. Further, one or more decision functions that trigger the one or more adaptation actions are defined. An abstract adaptation model is created to define when and how the adaptation can be done in the mobile multimedia content delivery service based on the said association between the one or more contexts and one or more quality of experience impactors, the one or more adaptation actions and the one or more decision functions. After that, the abstract adaptation model is transformed into an implementable adaptation model by identifying at least one constraint and mapping the one or more contexts in the abstract adaptation model with one or more available contexts during run time. In various embodiments of the present invention, the at least one constraint includes one or more mobile platforms capabilities and/or one or more software capabilities used to deliver the one or more mobile multimedia contents. Further, run time information is retrieved by monitoring the one or more available contexts and the at least one constraint at run time. Finally, a decision is made on when to adapt and which of the one or more adaptation actions to perform based on the implementable adaptation model.

In an additional embodiment, a system for adapting mobile multimedia content delivery service to enhance quality of experience of one or more users is described. As disclosed, the system includes a context identification module, a quality of experience impactors identification module, an association identification module, an adaptation action definition module, a decision function definition module, an abstract adaptation model creation module, a transformation module, a run time information retrieving module and a decision making module. The context identification module is configured to identify one or more contexts that impact on the quality of experience from one or more domains associated with the mobile multimedia content delivery service, wherein the one or more contexts are represented as one or more attributes associated with the one or more contexts. The quality of experience identification module configured to identify one or more quality of experience impactors. The association identification module is configured to define an association between the one or more contexts and the one or more quality of experience impactors. The adaptation action identification module is configured to define one or more adaptation actions which can be performed in the one or more domains. The decision function definition module is configured to define one or more decision functions that trigger the one or more adaptation actions. The abstract adaptation model creation module is configured to create an abstract adaptation model, by at least one of the computing devices, to adapt the mobile multimedia content delivery service based on the said association between the one or more contexts and one or more quality of experience impactors, the one or more adaptation actions and the one or more decision functions. The transformation module is configured to transform the abstract adaptation model to an implementable adaptation model by identifying at least one run time constraint and mapping the one or more contexts in the abstract adaptation model with one or more available contexts during run time. In various embodiments of the present invention, the at least one constraint includes one or more mobile platforms capabilities and/or one or more software capabilities used to deliver the one or more mobile multimedia contents. The run time information retrieving module is configured to retrieve run time information, by at least one of the computing devices, by monitoring the one or more available contexts and the at least one constraint at the run time. The decision making module is configured to make a decision on when to adapt and which of the one or more adaptation actions to perform, by at least one of the computing devices, based on the implementable adaptation model.

In another embodiment, a computer program product for adapting mobile multimedia content delivery service to enhance quality of experience of one or more users is described. The computer program product includes a computer usable medium having a computer readable program code embodied therein for adapting mobile multimedia content delivery service to enhance quality of experience of one or more users. The computer readable program code storing a set of instructions configured for identifying one or more contexts that impact on the quality of experience from one or more domains associated with the mobile multimedia content delivery service, wherein the one or more contexts are represented as one or more attributes associated with the one or more contexts, identifying one or more quality of experience impactors and an association between the one or more contexts and the one or more quality of experience impactors, identifying one or more adaptation actions which can be performed in the one or more domains, defining one or more decision functions that trigger the one or more adaptation actions, creating an abstract adaptation model, by at least one of the computing devices, to adapt the mobile multimedia content delivery service based on the said association between the one or more contexts and one or more quality of experience impactors, the one or more adaptation actions and the one or more decision functions, transforming the abstract adaptation model to an implementable adaptation model by identifying at least one run time constraint and mapping the one or more contexts in the abstract adaptation model with one or more available contexts during run time based on the at least one constraint, retrieving run time information, by at least one of the computing devices, by monitoring the one or more available contexts and the at least one constraint at run time and making a decision on when to adapt and which of the one or more adaptation actions to perform, by at least one of the computing devices, based on the implementable adaptation model.

BRIEF DESCRIPTION OF THE DRAWINGS

Various embodiments of the invention will, hereinafter, be described in conjunction with the appended drawings provided to illustrate, and not to limit the invention, wherein like designations denote like elements, and in which.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure provide a system and method for adapting mobile multimedia content delivery service to enhance quality of experience (QoE) of one or more users. This involves a two steps approach where an initial abstract adaptation model is created for the problem domain. This describes all contexts that can impact the QoE and builds a comprehensive adaptation model for multimedia content and secondly, a final model or implementable adaptation model is achieved that can be flexibly deployed based on real time constraints. A transformation framework enables the conversion of the abstract model to the implementable model satisfying the real time constraints. This invention can effectively combine information from different context domains.

Figure 1:
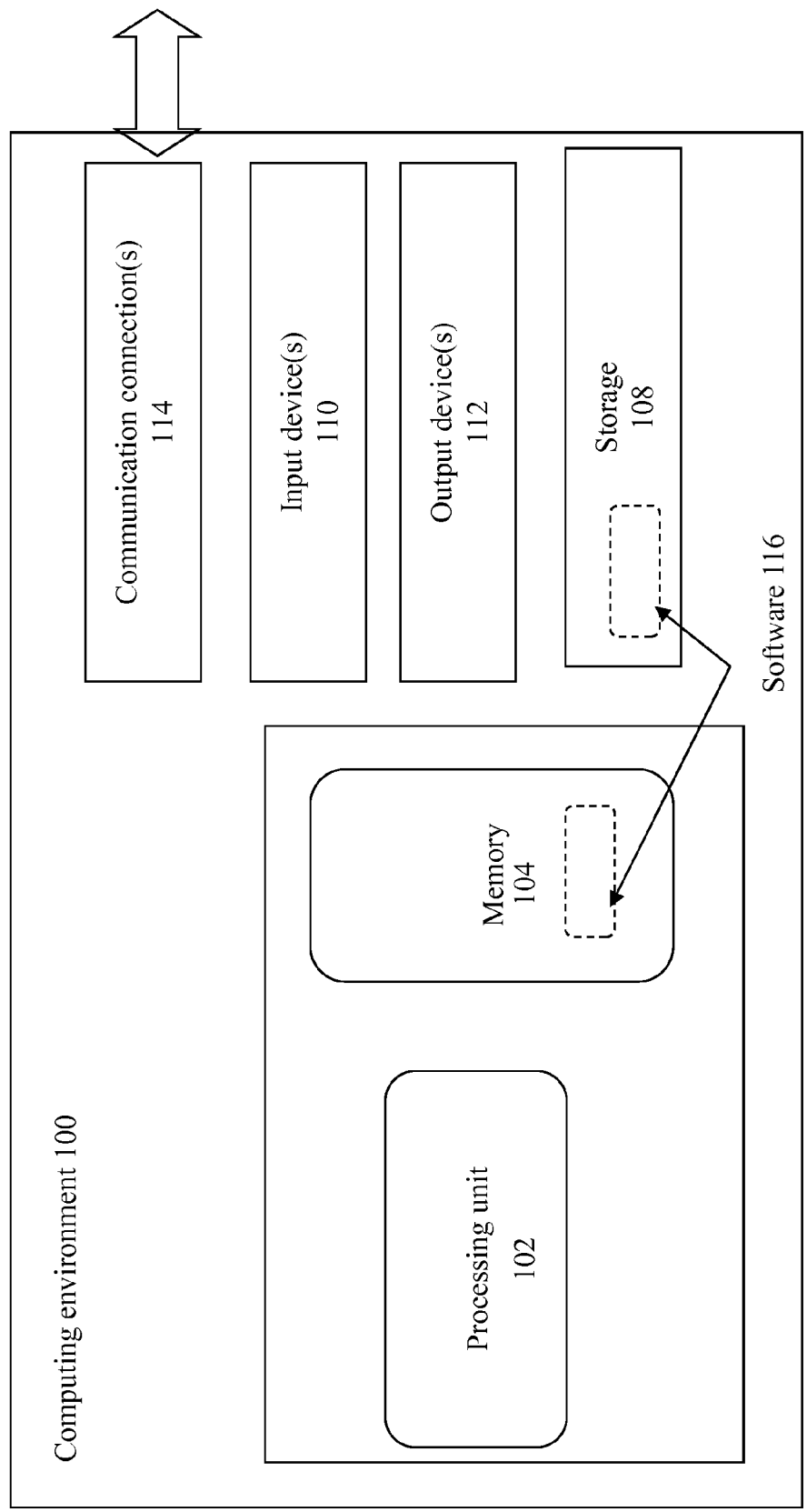
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
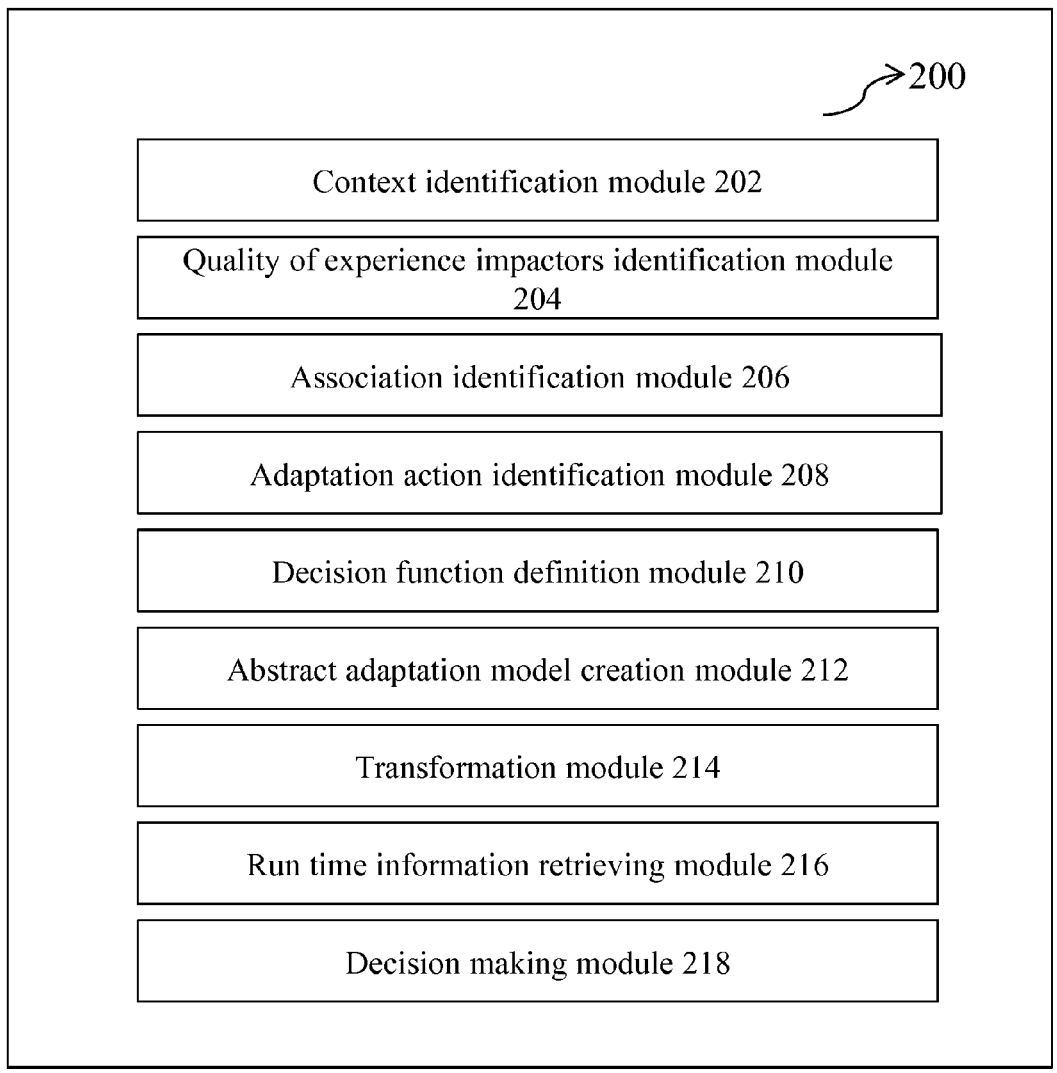
FIG. 2 is a block diagram illustrating a system for adapting mobile multimedia content delivery service to enhance quality of experience of one or more users, in accordance with an embodiment of the present invention.

FIG. 2 is a block diagram illustrating a system 200 for adapting mobile multimedia content delivery service to enhance quality of experience of one or more users. More particularly, the system 200 includes a context identification module 202, a quality of experience impactors identification module 204, an association identification module 206, an adaptation action identification module 208, a decision function definition module 210, an abstract adaptation model creation module 212, a transformation module 214, a run time information retrieving module 216 and a decision making module 218. The context identification module 202 identifies one or more contexts in mobile multimedia content delivery service that can impact on the QoE of the mobile users. As will be explained in more details below, the one or more contexts are measured with the help of one or more context attributes and the QoE is inferred from the values of quality of experience impactors (QoE impactors). In various embodiments of the present disclosure the QoE impactors may include network state, user preference, server state and device state. The one or more contexts may include but are not limited to user contexts, mobile device contexts, network contexts and media contexts. The information regarding the one or more contexts is collected from different domains associated with the mobile multimedia content delivery service. The quality of experience impactors identification module 204 is configured to identify different QoE impactors. The association identification module 206 determines the relationship between the one or more contexts in terms of context attributes and the one or more QoE impactors and also finds how the one or more contexts impact on the QoE. The adaptation action identification module 208 identifies one or more adaptation actions that can be performed by each of the participating domains. The one or more adaptation actions may include but are not limited to change in buffering rate, change in video bit rate, limit the number of allowed video bit rates and choose the initial bit rate. The decision function definition module 210 defines one or more decision functions, wherein the decision functions are expressed as conditions composed out of one or more context values and the successful evaluation of a condition triggers one or more adaptation actions. The abstract adaptation model creation module 212 creates an abstract adaptation model based on the association between the one or more contexts and the one or more QoE parameters, one or more adaptation actions and one or more decision functions. As will be better understood further herein the abstract adaptation model defines the basic adaptation rule. The transformation module 214 transforms the abstract adaptation model into an implementable adaptation model based on the real time scenario. According to an embodiment of the present disclosure, the transformation module 214 can identify the real time constraints and can map the one or more available contexts during run time with the one or more contexts present in the abstract adaptation model and thus the transformation module 214 can find out the relationship between the one or more available contexts and the one or more QoE impactors. The abstract adaptation model and the implementable adaptation model can support addition of new contexts and removal of existing contexts based on to real time constraints. The examples of real time constraints may include but are not limited to mobile platform capabilities and software capabilities used to deliver the mobile multimedia contents. According to various embodiments of the present disclosure, the abstract adaptation model and the implementable adaptation model can be executed interchangeably among different deployment environments. The run time information retrieving module 216 retrieves run time information regarding one or more available contexts under real time constraints by using a monitoring function. The decision making module 218 makes the decision on when to adapt and how to adapt the mobile multimedia content to enhance the QoE of the end users. Based on the run time information related to available contexts and the configured decision functions, the decision making module 218 decides when to adapt and which of the one or more adaptation actions to be performed based on the defined adaptation model.

Figure 3:
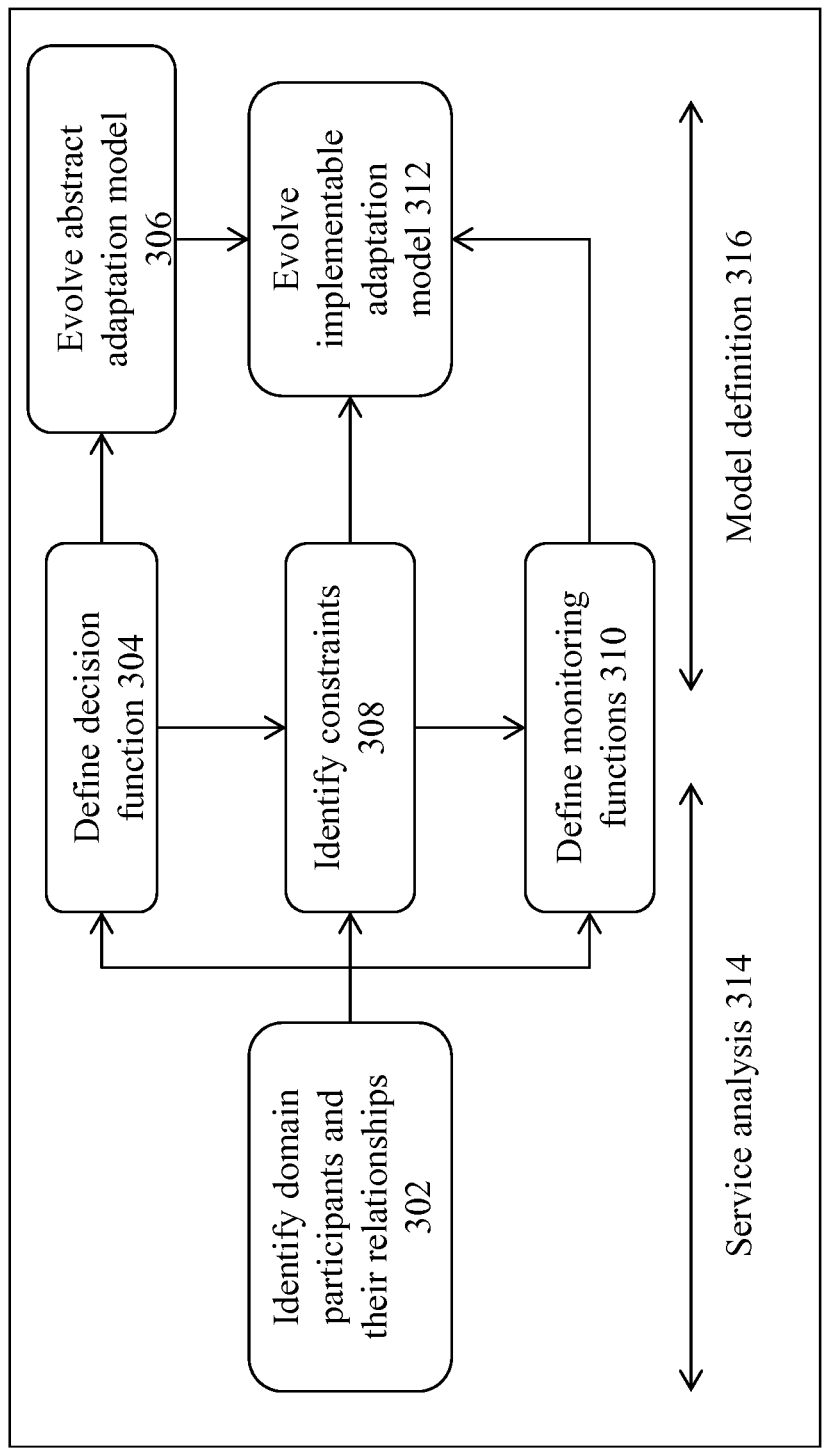
FIG. 3 is a flowchart, illustrating a two step approach to arrive at the guidelines for adapting mobile multimedia content delivery service to enhance quality of experience of one or more users, in accordance with an embodiment of the present invention.

FIG. 3 is a flowchart, illustrating a two step approach to arrive at the guidelines for adapting mobile multimedia content delivery service to enhance quality of experience of one or more users. The two steps include service analysis 314 and model definition 316. The service analysis 314 step includes identification of domains that participate in the end to end service delivery, identification of associated contexts and adaptation actions that can be executed in each domain, identification of relevant contexts that are external to a domain but observable from the domain and for each action, identification of the contexts whose values can trigger the execution of the action, as in step 302. The model definition step 308 includes defining the constraints under which the service needs to be delivered, defining the monitoring functions to be used to retrieve context information as in step 310, defining the decision function that can be used to process different sets of contexts and recommend appropriate action as mentioned in step 304. The list of possible triggers is derived from the set of contexts associated with the service. The abstract adaptation model is derived directly from the decision functions as in step 306. The implementable adaptation model is evolved using as input the abstract adaptation model, the identified run time constraints and the monitoring functions that is used to retrieve run time information of the available contexts.

Figure 4:
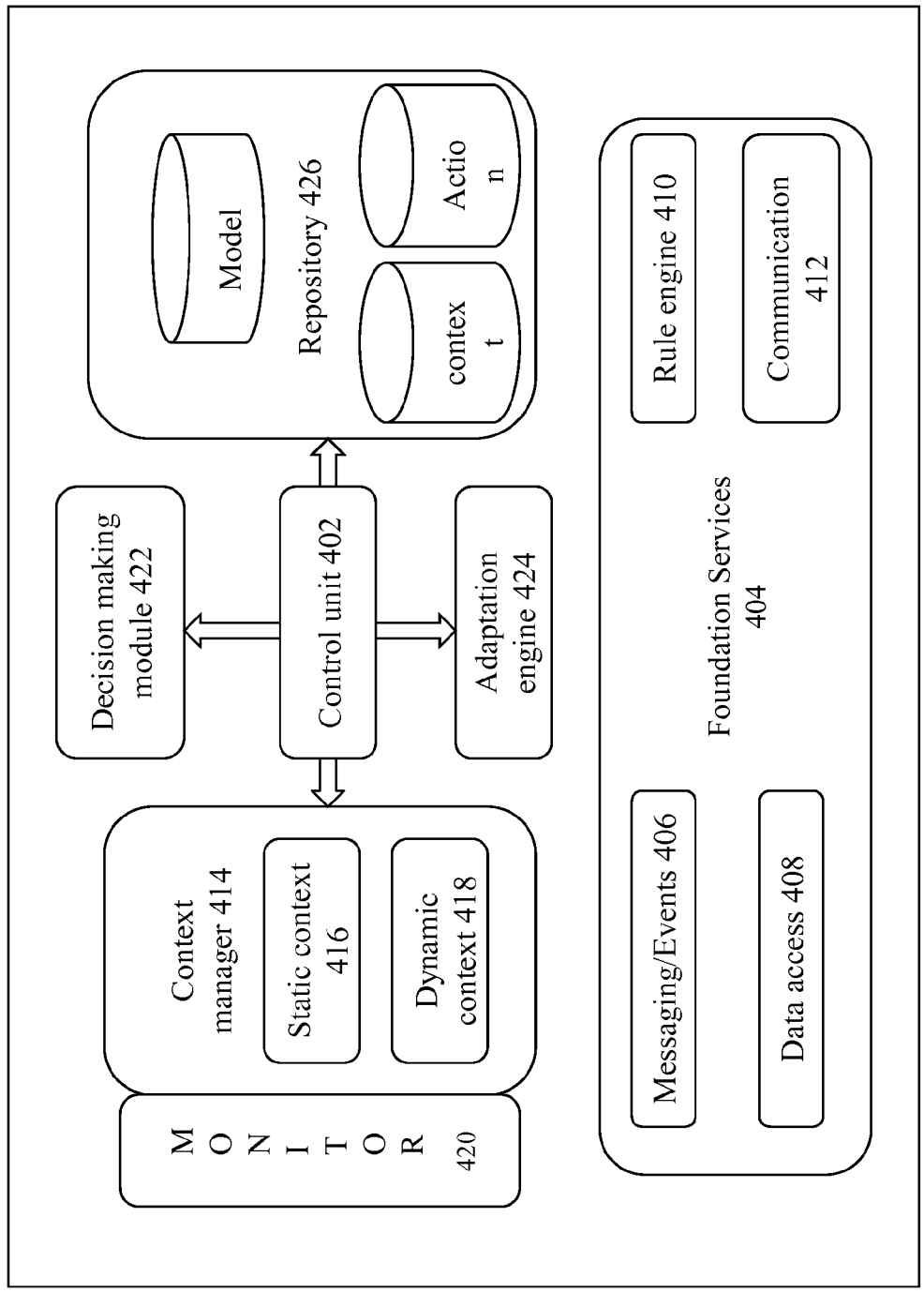
FIG. 4 is a block diagram illustrating the framework used to create the implementable model for adapting mobile multimedia content delivery service to enhance quality of experience of one or more users, in accordance with an embodiment of the present invention.

FIG. 4 is a block diagram illustrating the framework used to create the implementable adaptation model for adapting mobile multimedia content delivery service to enhance quality of experience of one or more users. The framework includes a control unit 402 which is its brain. It is responsible for setting up and managing a model instance. Key functions include, activation/deactivation of components, configuration of different components tuned to a specific implementation, monitoring the state of different components and enabling run-time control/reconfiguration of individual components. This is the only unit that has direct access to all components in the model. Interaction with components is via services published by each of the components. The framework further includes foundation services 404. The foundation services 404 include a set of common services that is required for effective functioning of the different components. These include messaging or event service 406 for decoupled exchange of information across components, rule engine 410 to support execution of different decision functions, data access services 408 to provide a uniform mechanism to retrieve persistent information related to different components and communication services 412 to provide a transparent mode of information exchange between different model instances running across domains. In addition, the framework includes context manager 414 and monitoring function 420 through which all contexts related information is monitored and managed. Contexts can be static 416 (values are fixed) or dynamic 418 (values can change at run-time). The context manager 414 provides services for accessing static context 416 and generates context change events signaling changes in the values of dynamic contexts 418. On the monitoring side, this component 420 provides the ability to switch on/off monitoring of specific contexts as well as controlling how monitored context needs to be reported. Examples of this include support for selective (based on pre-set conditions) reporting of context values. There can be multiple monitoring functions associated with a specific context. The exact function to be used is selected based on information sent by the control unit. The framework again includes a decision making module 422 which is responsible for detecting when an adaptation has to be done and what should be the actions to be executed. This is achieved by listening to different triggers (in the form of context change events) and executing appropriate decision function sequences. Decision functions are typically represented as rule sets that can be dynamically loaded and executed based on the received context change triggers. Decision making module 422 will also support dynamic re-configuration of the decision model based on commands from the control unit 402. When an adaptation trigger is detected, this component 422 will generate an event specifying the list of actions to be executed. Actions can include any of the following.

a. Adaptations that can be performed in the current domain
b. Adaptations that need to be performed in a different domain
c. Information that needs to be sent to another domain (where the decision model is being executed in a distributed fashion).

Further, the framework includes an adaptation engine 424 which manage the execution of actions selected by the decision making module 422. Implementation of actions is platform specific. For example, at the client side, the actions may include buffering rate control and/or network selection. On the other hand, at the network, the actions may include prioritization and/or on-demand bandwidth allocation. Again, if the platform is server then the actions may include adaptive streaming and/or scalable video coding. The adaptation engine presents a control layer that interfaces with platform specific components to execute the selected action. For actions which are not associated with the current domain, the adaptation engine will send details of the adaptation trigger and recommended action to the target domain (where it can be executed) using the communication services. The framework further includes a repository 426 which manage all persistent information associated with the service. These include information pertaining to contexts, actions as well as the transformed adaptation model.

Figure 5:
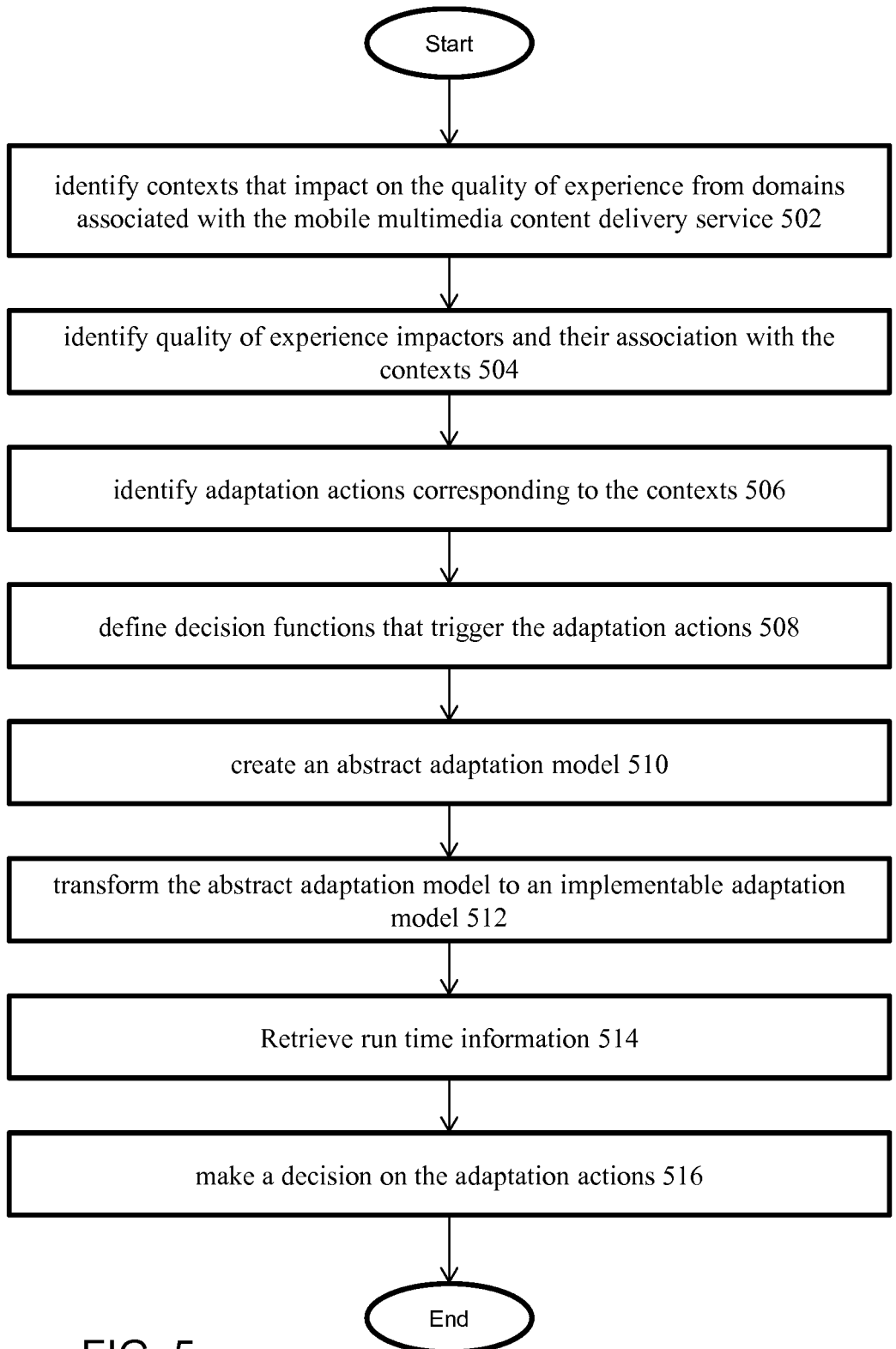
FIG. 5 is a flowchart, illustrating a method for adapting mobile multimedia content delivery service to enhance quality of experience of one or more users, in accordance with an embodiment of the present invention.

FIG. 5 is a flowchart, illustrating a method for adapting mobile multimedia content delivery service to enhance quality of experience of one or more users. The method includes identifying one or more contexts that can impact on the QoE of the mobile users, as in step 502. The one or more contexts can be collected from different domains associated with the mobile multimedia content delivery service. The domains represent the participants involved in the delivery of the multimedia content delivery service. The domains may include user, network, service entities and so forth. The one or more contexts are the collection of information that together provides comprehensive view of different domains. The context information may be static or dynamic. The one or more contexts may include user contexts, mobile device contexts, network contexts and media contexts. The examples of user contexts may include but are not limited to user location, network type preference and video disable option. The examples of mobile device contexts may include but not limited to screen size, memory usage and battery state. The QoE is best if the video resolution is matched with the device screen size and device resolution. Larger the screen size, higher the resolution and better the experience. On the other hand, if the device is running low on power then the frequent adaptation may worsen the condition. So, the rate of adaptation can be adjusted accordingly. The example of network contexts may include but are not limited to packet loss, latency, jitter and bandwidth. Some percentages of IP data packets are lost somewhere in the path from the source to the destination out of the total number of transmitted packets. It may happen due to signal degradation over the network medium because of multi-path fading, congestion, corrupted packets rejected in transit, faulty network hardware, faulty network drivers or normal routing routines, signal to noise ratio and distance between the transmitter and receiver. The latency may be caused because of propagation delay, processing delay and/or queuing delay. The causes of jitter may be queuing, contention and/or serialization effects on the path through network. Bandwidth refers to the amount of data transferred across network within a specified period. The lower bandwidth represents bad network condition while a high bandwidth implies good network state. The examples of media contexts may include but are not limited to supported resolution, type of encoding and encoding bitrate. Resolution denotes the number of pixels that can be displayed in each dimension. It is usually refer to as width*height. The higher number of pixels implies high quality of video, as more information is packed for the same display size. The encoding bitrate is the number of bits used per unit of playback time to represent a continuous medium. It is important to watch the video without interruption. All these contexts determine the final QoE for the users. For example, packet loss may causes ugly artifacts and/or noise, insufficient bandwidth may causes trails, high compression rate may causes gibbs effect, blockiness and/or posterization, delay may causes data unavailability and/or unintelligible real time interaction. The QoE is a subjective measure of the user's experiences using mobile services. It is the user perception of quality of services provided to him. It is expressed in terms of user terminology rather than a specific unit of measure. The QoE can be expressed as Excellent, Very good, Good, Fair and Poor. Excellent refers that the video is streamed smoothly without any buffering pause or obstructions, Very good refers that the video is paused for a fraction of second initially but rest flows smoothly, Good refers that the video takes a little time before starting and pause in between for buffering, Fair refers that video takes some time to start and is paused in between frequently and Poor refers that it is unable to watch video as it pauses more frequently and the subsequent play out time is very less.

Referring back to FIG. 5, the quality of experience impactors and their association with the one or more contexts are identified, as in step 504. It first determines all the QoE impactors and then finds out the relationship between a particular context and a QoE impactor. The QoE impactors may include but are not limited to network state, server state and device state.

The one or more adaptation actions are identified that can be performed in one or more domains, as in step 506. The adaptation actions represent activities that can be executed by a domain which leads to appropriate adaptation of the service. In accordance with an embodiment of the present disclosure, the adaptation actions may include but are not limited to changing the bitrate of the streaming video and/or increase/reduce buffering rate output. The goal of this is to deliver the best possible end user QoE at any given point of time. At step 508, the one or more decision functions are defined that trigger the one or more adaptation actions. The one or more decision functions are expressed as conditions composed out of one or more context values and successful evaluation of a condition triggers one or more adaptation actions. Thus, only certain types of changes will lead to adaptation. After that, based on the association between the one or more contexts and one or more QoE impactors, the context values and the adaptation actions, the abstract adaptation model is created, as in step 510. The abstract adaptation model takes all context information and the expected QoE to define the basic adaptation rules. It is not constrained by any implementation specific issues. By defining the abstract adaptation model in terms of elementary context attributes, it is easy to adapt the same to various implementation instances with different constraints. This also enables the model to be easily adapted to application specific requirements. For example, an adaptation model for streaming video can be developed with network and device as the key context sets. In a preferred embodiment, in the case of network, the elementary parameters that can effectively represent adaptation rules are packet loss, latency, jitter and available bandwidth. In case of device, the preferred elementary parameters can be device resolution and/or battery levels.

Referring back to FIG. 5, based on the run time constraints, the abstract adaptation model is transformed into an implementable adaptation model, as in step 512, by mapping the contexts present in the abstract model and the available contexts present during runtime due to real time constraints. The implementable adaptation model is the final model which can be deployed to the real time scenario. For example, any attempt to implement the abstract adaptation model directly on a specific mobile may not be possible due to some platform specific constraints which may include inability to monitor the network context attributes and/or inability to control the buffering rate of the player at any given instance. However, the platform does allow measurement of actual bytes sent and received on specific connections. In this circumstance, the abstract model can be transformed into implementable model by mapping the available contexts (i.e. bytes sent/received) to contexts present in the abstract model and finally determining its effects on the QoE impactors and hence the resultant QoE under any given condition. According to various embodiments of the present disclosure, the abstract adaptation model and the implementable adaptation model support addition of new context as well as removal of existing contexts and the abstract adaptation model can be transformed into an implementable adaptation model in such a way that its components can be executed interchangeably across different deployment environment. The run time information is retrieved by monitoring one or more available contexts, as in step 514. In actual real time settings, measurable contexts can change significantly. Also the context values may vary. The examples of real time constraints may include but are not limited to mobile platform capabilities and/or software capabilities which are used to deliver the mobile multimedia contents and/or lack of access to one or more domains and inability to perform certain adaptation actions in the one or more domains. Monitoring function is responsible for continuously gathering information associated with different types of concept.

Figure 6:
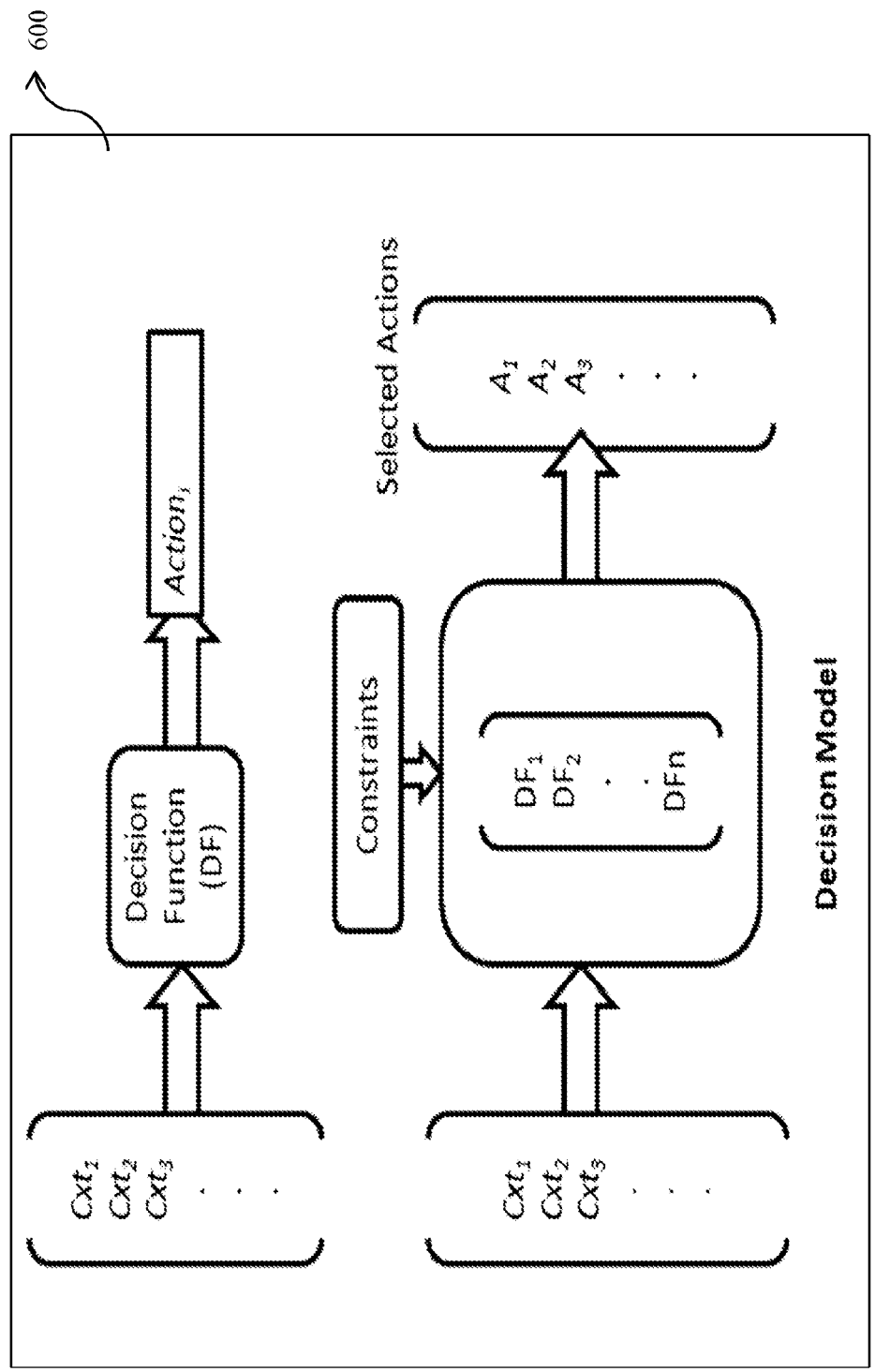
FIG. 6 illustrates an operation of a decision making module for adapting mobile multimedia content delivery service to enhance quality of experience of one or more users, in accordance with an embodiment of the present invention.

Finally, the decision is made on the adaptation actions, as in step 516, based on the implementable adaptation model. The decision making module 216 identifies the trigger factor for adaptation and select the appropriate adaptation action based on the real time scenario to enhance the resultant QoE of the end users. For example, if the issue is network congestion in the last mile, then changing the buffering rate would be an effective solution rather than to change the video bit rate. FIG. 6 illustrates an operation of a decision making module for adapting mobile multimedia content delivery service to enhance quality of experience of one or more users. Decision functions are responsible for detecting when a service needs to be adapted and recommending the appropriate action(s). Decision functions embed within themselves, the mapping between contexts and their impact on QoE as well as the possible sets of actions that can help in delivering the best possible end-user experience. They can also act as constraint enforcers, limiting the set of adaptations that are possible in a given instance based on current context. In a complex environment involving multitudes of contexts and actions, a decision model may be employed for identifying when to adapt and how to adapt. Such a model incorporates within itself, a multitude of decision functions and intelligence about the triggers for execution of different decision function sequences. Triggers to the model are typically changes in context. On receiving a trigger, the model selects and executes the right set of decision function sequences, to detect if the service needs to be adapted and recommend the adaptive action that can yield the optimal QoE. The decision model thus encompasses the implementable adaptation model along with intelligence on what decision functions to evaluate for a given trigger (context change event).

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method, implemented at least in part by one or more computing devices, for adapting mobile multimedia content delivery service to enhance quality of experience of one or more users, comprising:
    identifying one or more contexts that impact on the quality of experience from one or more domains associated with the mobile multimedia content delivery service, wherein the one or more contexts are represented as one or more attributes associated with the one or more contexts;
    identifying one or more quality of experience impactors and an association between the one or more contexts and the one or more quality of experience impactors;
    identifying one or more adaptation actions which can be performed in the one or more domains;
    defining one or more decision functions that trigger the one or more adaptation actions, wherein the one or more decision functions include one or more conditions;
    creating an abstract adaptation model, by at least one of the computing devices, to adapt the mobile multimedia content delivery service based on the said association between the one or more contexts and one or more quality of experience impactors, the one or more adaptation actions and the one or more decision functions;
    transforming the abstract adaptation model to an implementable adaptation model by identifying the at least one run time constraint and mapping the one or more contexts in the abstract adaptation model with one or more available contexts during run time;
    retrieving run time information, by at least one of the computing devices, by monitoring the one or more available contexts and the at least one constraint at the run time; and
    making a decision, by at least one of the computing devices, on an implementation of the one or more adaptation actions based on the implementable adaptation model.

2. The method of claim 1, wherein the one or more contexts include one or more user contexts, one or more mobile device contexts, one or more network contexts and one or more media contexts.

3. The method of claim 1, wherein the one or more domains represent one or more participants involved in the mobile multimedia content delivery service.

4. The method of claim 1, wherein the one or more conditions comprises of one or more context values.

5. The method of claim 1, wherein the one or more adaptation actions triggered upon a successful evaluation of the one or more conditions.

6. The method of claim 1, wherein the abstract adaptation model defines one or more basic adaptation rules.

7. The method of claim 1, wherein the abstract adaptation model and the implementable adaptation model support addition of one or more new contexts.

8. The method of claim 1, wherein the one or more quality of experience impactors include at least one of network state, server state and device state.

9. The method of claim 1, wherein the at least one constraint includes at least one of one or more mobile platforms capabilities, access to the one or more domains and their adaptation actions and one or more software capabilities used to deliver the one or more mobile multimedia contents.

10. The method of claim 1, wherein the step of transformation further includes defining one or more monitoring functions to be used at runtime to retrieve context information.

11. The method of claim 1, wherein run time information is retrieved by using the one or more monitoring functions.

12. The method of claim 1, wherein the abstract adaptation model and the implementable adaptation model and the one or more monitoring functions are executed interchangeably among a plurality of deployment environments.

13. The method of claim 1, wherein the step of making the decision comprising:
    identifying the trigger for the adaptation by executing the one or more decision functions; and
    selecting at least one of the one or more adaptation actions based on the trigger.

14. The method of claim 1, wherein the one or more adaptation action includes at least one of change in video bit rate and change in buffering rate.

15. A system for adapting mobile multimedia content delivery service to enhance quality of experience of one or more users comprising:
    a processor in operable communication with a processor readable storage medium, the processor readable storage medium containing one or more programming instructions whereby the processor is configured to implement:
        a context identification module configured to identify one or more contexts that impact on the quality of experience from one or more domains associated with the mobile multimedia content delivery service, wherein the one or more contexts are represented as one or more attributes associated with the one or more contexts;
        a quality of experience impactors identification module configured to identify one or more quality of experience impactors;
        an association identification module configured to identify an association between the one or more contexts and the one or more quality of experience impactors;
        an adaptation action identification module configured to define one or more adaptation actions which can be performed in the one or more domains;
        a decision function definition module configured to define one or more decision functions that trigger the one or more adaptation actions;
        an abstract adaptation model creation module configured to create an abstract adaptation model to adapt the mobile multimedia content delivery service based on the said association between the one or more contexts and one or more quality of experience impactors, the one or more adaptation actions and the one or more decision functions;
        a transformation module configured to transform the abstract adaptation model to an implementable adaptation model by identifying at least one run time constraint and mapping the one or more contexts in the abstract adaptation model with one or more available contexts during run time;

a run time information retrieving module configured to retrieve run time information, by at least one of the computing devices, by monitoring the one or more available contexts and the at least one constraint at the run time; and a decision making module configured to make a decision, by at least one of the computing devices, on an implementation of the one or more adaptation actions based on the implementable adaptation model.

16. The system of claim 14, wherein the one or more contexts include one or more user contexts, one or more mobile device contexts, one or more network contexts and one or more media contexts.

17. The system of claim 14, wherein the one or more domains represent one or more participants involved in the mobile multimedia content delivery service.

18. The system of claim 14, wherein the abstract adaptation model defines one or more basic adaptation rules.

19. The system of claim 14, wherein the abstract adaptation model and the implementable adaptation model support addition of one or more new contexts.

20. The system of claim 14, wherein the transformation module further includes a monitoring function determination module configured to monitor one or more monitoring functions to be used at run time to retrieve context information.

21. The system of claim 14, wherein run time information is retrieved by using the one or more monitoring functions.

22. The system of claim 14, wherein the abstract adaptation model and the implementable adaptation model and the one or more monitoring functions are executed interchangeably among a plurality of deployment environments.

23. The system of claim 14, wherein the one or more quality of experience impactors include at least one of network state, server state and device state.

24. The system of claim 14, wherein the at least one constraint includes at least one of one or more mobile platforms capabilities, access to the one or more domains and their adaptation actions and one or more software capabilities used to deliver the one or more mobile multimedia contents.

25. The system of claim 14, wherein the decision making module comprises:

a trigger identification module configured to identify the trigger for the adaptation by executing the one or more decision functions; and an adaptation action selection module configured to select at least one of the one or more adaptation actions based on the trigger.

26. The system of claim 14, wherein the one or more adaptation action includes at least one of change in video bit rate and change in buffering rate.

27. A computer program product for use with a computer, the computer program product comprising a non-transitory computer readable medium having computer readable program code embodied therein for adapting mobile multimedia content delivery service to enhance quality of experience of one or more users, the computer readable program code storing a set of instructions configured for:

identifying one or more contexts that impact on the quality of experience from one or more domains associated with the mobile multimedia content delivery service, wherein the one or more contexts are represented as one or more attributes associated with the one or more contexts;

identifying one or more quality of experience impactors and an association between the one or more contexts and the one or more quality of experience impactors;

identifying one or more adaptation actions which can be performed in the one or more domains;

defining one or more decision functions that trigger the one or more adaptation actions, wherein the one or more decision functions include one or more conditions;

creating an abstract adaptation model, by at least one of the computing devices, to adapt the mobile multimedia content delivery service based on the said association between the one or more contexts and one or more quality of experience impactors, the one or more adaptation actions and the one or more decision functions;

transforming the abstract adaptation model to an implementable adaptation model by identifying the at least one run time constraint and mapping the one or more contexts in the abstract adaptation model with one or more available contexts during run time;

retrieving run time information, by at least one of the computing devices, by monitoring the one or more available contexts and the at least one constraint at the run time; and making a decision, by at least one of the computing devices, on an implementation of the one or more adaptation actions based on the implementable adaptation model.

28. The computer program product of claim 25, wherein the one or more contexts include one or more user contexts, one or more mobile device contexts, one or more network contexts and one or more media contexts.

29. The computer program product of claim 25, wherein the one or more quality of experience impactors include at least one of network state, server state and device state.

* * * * *